United States Patent
Tkacik et al.

(10) Patent No.: US 7,185,249 B2
(45) Date of Patent: Feb. 27, 2007

(54) METHOD AND APPARATUS FOR SECURE SCAN TESTING

(75) Inventors: Thomas Tkacik, Phoeniz, AZ (US);
John E. Spittal, Jr., Waddel, AZ (US);
Jonathan Lutz, Kitchener (CA);
Lawrence Case, Phoenix, AZ (US);
Douglas Hardy, Scottsdale, AZ (US);
Mark Redman, Gilbert, AZ (US);
Gregory Schmidt, Chandler, AZ (US);
Steven Tugeberg, Scottsdale, AZ (US);
Michael D. Fitzsimmons, Austin, TX (US);
Darrell L. Carder, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 345 days.

(21) Appl. No.: 10/135,877

(22) Filed: Apr. 30, 2002

(65) Prior Publication Data
US 2003/0204801 A1 Oct. 30, 2003

(51) Int. Cl.
*G01R 31/28* (2006.01)
*H03K 19/00* (2006.01)
(52) U.S. Cl. .................................. 714/726; 326/16
(58) Field of Classification Search ............... 714/726; 326/16
See application file for complete search history.

(56) References Cited

U.S. PATENT DOCUMENTS

| | | | | |
|---|---|---|---|---|
| 4,947,357 A | * | 8/1990 | Stewart et al. | 714/726 |
| 5,163,155 A | * | 11/1992 | Omiya | 714/726 |
| 5,347,523 A | * | 9/1994 | Khatri et al. | 714/730 |
| 5,530,749 A | | 6/1996 | Easter et al. | |
| 5,627,842 A | * | 5/1997 | Brown et al. | 714/727 |
| 5,757,819 A | * | 5/1998 | Segars | 714/727 |
| 5,898,776 A | | 4/1999 | Apland et al. | |
| 6,061,010 A | | 5/2000 | Adams et al. | |
| 6,216,251 B1 | * | 4/2001 | McGinn | 714/800 |
| 6,304,099 B1 | * | 10/2001 | Tang et al. | 326/38 |
| 6,539,511 B1 | * | 3/2003 | Hashizume | 714/727 |
| 6,754,862 B1 | * | 6/2004 | Hoyer et al. | 714/725 |
| 2003/0126531 A1 | * | 7/2003 | Tu et al. | 714/726 |

* cited by examiner

*Primary Examiner*—Joseph D. Torres

(57) ABSTRACT

A processor, scan controller, and method for protecting sensitive information from electronic hacking is disclosed. To maintain the security of the sensitive data present in a processor, the scan controller denies access to the scan chain until data is cleared from scan-observable portions of the processor, then clears the scan chain again prior to exiting test mode and resuming normal operation. Clearing or otherwise modifying data stored in the scan-observable portions of a processor when transitioning to and/or from a test mode will prevent unauthorized personnel from simply shifting secure data out of the scan chain, and from pre-loading data into the scan chain prior to normal operation in an attempt to set sensitive state information.

19 Claims, 4 Drawing Sheets

METHOD AND APPARATUS FOR SECURE SCAN TESTING

FIELD OF THE DISCLOSURE

The present disclosure relates generally to processor scan-testing, and more particularly to scan testing secure devices.

BACKGROUND

In its most basic form, a scan-chain is a series of elements linked together so that an output of one element is linked to an input of the next element in the series, which in turn has an output linked to an input of a subsequent element, and so on. Sometimes, circuit designers use scan-chains to provide test access to internal elements of a processor that would be otherwise inaccessible. By using a scan chain, a test engineer can shift data into a processor sequentially, using a single input port. The processor operates on the data, and the results of the operations are then read out sequentially using a single output port. In this way a maximum amount of internal circuitry can be tested with a minimum of additional complexity.

This ease of testing, however, gives rise to data access issues that must be taken into consideration, especially in light of the encryption and security requirements of the software, telecommunications, entertainment, and other industries. For example, the telecommunications industry has a need to have secure codes stored in some of the semiconductor chips used to process information in mobile phones, pagers, and the like. These secure codes may be used as part of proprietary data processing methods, for hardware identification and authentication, to specify a secure state, or for any number of other purposes. However, if the circuitry responsible for handling these codes is accessible via a scan chain, competitors might be able to exploit the scan chain to gain access to the secure codes stored in the chip or to enter a secure state.

In order to address the problem of exploiting the scan chain to gain access to secure information stored in the chip or to fool the chip into thinking it is in a secure state, manufacturers have generally removed circuitry used to process secure information from the scan chain. By removing this circuitry from the scan chain, it becomes more difficult for unauthorized users to gain access to the secure codes. However, this solution leaves a significant portion of the chip unable to be completely tested.

As should be apparent from the above discussion, currently available testing methodologies are less than ideal, in that they force a designer to choose either test access with decreased data security, or data security without test access for significant portions of a data processor. What is needed is some way to permit test access to portions of a processor that process secure information, but maintaining the secrecy of any secure information in the processor.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

In the following detailed description of the figures, the terms "assert" and "negate" (or "de-assert") are used when referring to the rendering of a signal, status bit, or similar apparatus into its logically true or logically false state, respectively. If the logically true state is a logic level one, the logically false state is a logic level zero. And if the logically true state is logic level zero, the logically false state is a logic level one.

Therefore, each signal described herein may be designed as positive or negative logic, where negative logic can be indicated by bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one.

FIGS. 1–7 illustrate how a scan controller can be used in an information processor to provide a level of protection from electronic hacking by preventing access to sensitive information via processor test modes. The manner in which security is maintained allows for increased component test coverage, without sacrificing the security of sensitive information. This increased test coverage should, in turn, allow less costly product testing and quicker time to market.

To maintain the security of sensitive data, one embodiment described herein clears read-sensitive security data from scan-observable portions of the processor prior to enabling access to the scan chain, and clears write-sensitive security data prior to exiting test mode and resuming normal operation. Clearing sensitive portions of the scan chain at these times will prevent unauthorized personnel from simply scanning out secure data, and from pre-loading elements on the scan chain prior to normal operation in order to set sensitive state information.

Figure 1:
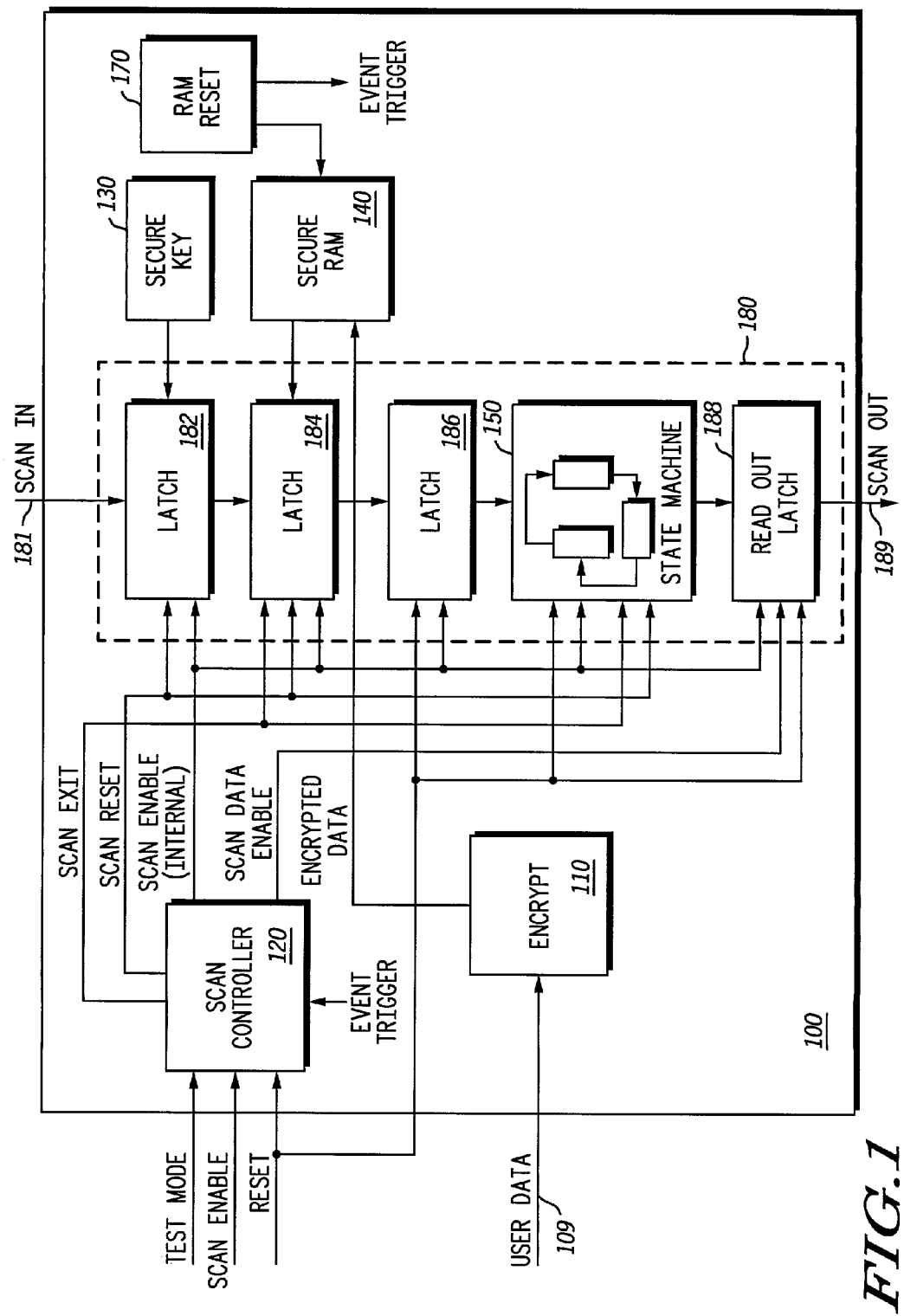
FIG. 1 is a block diagram of a processor employing a scan controller according to an embodiment of the present disclosure.

Referring first to FIG. 1, a processor employing a scan controller according to the teachings set forth herein will be discussed, and is designated generally as processor 100. Processor 100 includes a series of latches 182–188 and state machine 150 that lie on scan chain 180; various sources of sensitive information, such as secure key 130 and secure random access memory (RAM) 140; and scan controller 120, which controls access to scan chain 180 and provides reset and/or mode configuration signals. Processor 100 also includes encrypt block 110 for encrypting user data, and RAM reset 170 to clear information from secure RAM 140. Note that while only certain elements are shown as being on scan chain 180, any element for which scan testing is desired, for example encrypt block 110, may also be placed on scan chain 180.

The information to be protected from access may include information stored in processor 100 during manufacture, such as hardwired identification keys and proprietary hardware/firmware implemented algorithms, or sensitive information stored after manufacturing. For example, secure key 130 may be a hardware identification key used to identify a particular mobile communication device, and state machine 150 may be a series of logical elements that are used by processor 100 to determine if the processor is in a secure operational mode. In each of these cases, the information built into processor 100 needs to be kept secure in order to discourage counterfeiting, or to make reverse engineering by competitors more difficult.

While secure key 130 may be implemented during manufacture, secure RAM 140 is one way to implement secure information storage in processor 100 after completion of the manufacturing process. For example, assume processor 100 is a graphics processor used in a wireless Internet appliance. If a particular service provider has a proprietary graphics compression algorithm, the provider can load the encrypted algorithm into processor 100 via user data input 109. Processor 100 would then decrypt the algorithm using encrypt block 110, and forward the decrypted data for storage in secure RAM 140. It will be appreciated that suitable methods of storing information in processor 100, in addition to or in place of those illustrated in FIG. 1, may be employed by those skilled in the art without departing from the teachings set forth herein.

Latches 182, 184, 186, and 188 are capable of functioning in both a normal mode and a test mode. In normal mode latches 182 and 184, as well as state machine 150, hold sensitive information for use by other portions of processor 100. For example, latch 182 may be one of a number of latches used to access secure key 130 and deliver secure key 130 to an authentication portion (not illustrated) of processor 100. As another example, an encrypted software subroutine may be passed from secure RAM 140 to a central processing unit through latch 184. When latches 182 or 184 contain information that should not be accessed without proper authority, the latches are said to contain read-sensitive information.

State machine 150 may hold data that places processor 100 in a non-secure mode. If the state data in state machine 150 could be altered just prior to exiting a scan-mode, the processor could be tricked into believing that it is in a non-secure mode, thereby possibly compromising secure operation. Data that needs to be protected from being stored after scan mode operation may be referred to as write-sensitive data. Other latches (not illustrated) may be used for storing outputs of other state machines (not illustrated) which may contain read or write sensitive information. In each of these examples, the security of the data could be compromised if access to the scan chain was not protected.

In test mode, latches 182, 184, 186 and latches associated with state machine 150 are observable outside processor 100 via scan chain 180. Access to scan chain 180 is provided by scan-in port 181, and scan-out port 189. Data is clocked into latch 182, the first scan-observable latch on scan chain 180, via scan-in port 181. Each time data is clocked into latch 182, the output data at latch 182 is sent to the input of latch 184. Each time the output data of latch 182 is sent to the input of latch 184, the output data latch 184 is sent to the input of latch 186, and so on, until the data travels all the way through the chain to scan-out port 189. For example, assume that in the illustrated scan chain 180, a logic 1 is clocked into latch 182 during the first clock cycle. During the second clock cycle, the logic 1 stored in latch 182 will be delivered to latch 184. During the third clock cycle that same logic one would be sent to latch 186. The process would continue until, finally, the logic 1 would be transferred to readout latch 188 and made available for readout on scan-out port 189 during the fourth clock cycle. Those skilled in the art will appreciate that this simple example is merely illustrative, and that data shifted into a particular latch may be manipulated in various ways before being sent through the remainder of scan chain 180.

In the illustrated embodiment, readout latch 188, in contrast to latches 182, 184 and state machine 150, does not hold sensitive data during a normal mode. Instead, readout latch 188, under control of scan controller 120, blocks readout of data from the scan chain except under certain predetermined conditions. It will be appreciated that, while not illustrated, a latch controlled in a manner similar to readout latch 188 could be used at the input to scan chain 180 to block any data from being scanned in. It will also be appreciated that in other embodiments, such as in various embodiments discussed hereinafter, readout latch 188 is not used.

Scan controller 120 controls access to scan chain 180, and consequently controls access to any sensitive information that may be stored in latches 182, 184 and state machine 150. In at least one embodiment, scan controller 120 receives as input a TEST MODE signal, a SCAN ENABLE signal, a RESET signal, and an EVENT TRIGGER signal. Using these input signals scan controller 120 generates a SCAN ENABLE (INTERNAL) signal and a SCAN DATA ENABLE signal, which are used to configure latches 182–188 and state machine 150 to allow scan-testing. For example, an asserted SCAN ENABLE (INTERNAL) places each scan latch in scan mode, while an asserted scan data enable allows data to be scanned to the scan out port 189. Scan controller 120 also generates SCAN EXIT and SCAN RESET signals that are used to reset elements on scan chain 180 as needed.

In the illustrated embodiment, scan controller 120 controls most reset sequences associated with scan chain 180, ensuring that each of latches 182–188 and state machine 150 are properly reset as required. Note that in the illustrated embodiment, latches 186 and 188, which are not used to store sensitive information, need not be reset to protect sensitive information. However, since it may be desirable to reset latches 186 and 188 during a "hard" reset or at other times, the RESET input to scan controller 120 is provided to reset latches 186, 188. In other embodiments, the RESET signal may be provided to secure scan chain elements, for example state machine 150, in addition to the SCAN RESET signal. While it may be desirable in many circumstances to reset every element on the scan chain, non-sensitive elements may be left un-reset by outputs of scan controller 120 without departing from the teachings set forth herein.

RAM reset 170 is used in one embodiment to clear information from secure RAM 140 in response to some event. RAM reset 170 may be controlled by a separate reset state machine (not illustrated), directly by scan controller 120, or otherwise. RAM reset 170 may also provide an EVENT TRIGGER signal indicating that data stored in secure RAM 140 has been successfully cleared. This output signal could be used as the EVENT TRIGGER input for scan controller 120. Use of the EVENT TRIGGER signal can be particularly useful when the time necessary to reset secure RAM 140 is indeterminate. It will be appreciated that although RAM reset 170 is used in the illustrated embodiment, it is not necessary for every embodiment. In at least one embodiment, generation of a SCAN DATA ENABLE signal, a SCAN ENABLE (INTERNAL) signal, and an EVENT TRIGGER signal or other similar signal is controlled, at least in part, by a signal (not shown in FIG. 1) indicating whether or not data contained in elements of scan chain 180 has been secured by performing a reset or otherwise. One embodiment of such a signal is the UNSECURE* signal, discussed subsequently with respect to FIG. 5.

Figure 2:
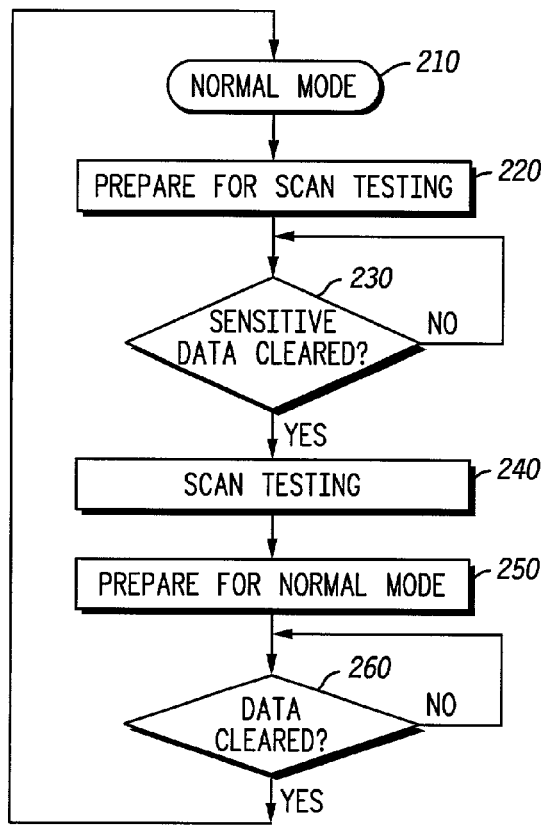
FIG. 2 is a flow chart illustrating a method of scan testing that includes clearing sensitive data before allowing access to scan-observable portions of a processor according to an embodiment of the present disclosure.

Referring next to FIG. 2, a method of scan testing a processor such as processor 100 (FIG. 1) according to an embodiment of the present disclosure will be discussed. The method begins in step 210, with processor 100 operating in a normal, or non-test, mode. In normal mode, elements of scan chain 180 are used in performing ordinary processing tasks. While the elements on scan chain 180 are in normal mode, they are not accessible via SCAN-IN port 181 or SCAN-OUT port 189, because latches 182–188 and state machine 150 are not configured to receive or send information via their scan-chain ports. In normal mode, latches 182, 184 and state machine 150 may contain sensitive data or state information, so that if the elements on scan chain 180 could be enabled for scan-chain access during normal operations, any information contained in the elements of the scan chain could be read out of scan-out port 189, possibly compromising the security of the information.

The method proceeds to step 220, in which the scan chain is prepared for testing by resetting, or otherwise modifying sensitive data in scan chain latches 182, 184 and state machine 150 in response to a desired input or combination of inputs. For example, in one embodiment, receipt of an asserted TEST MODE signal and an asserted SCAN ENABLE signal will cause scan controller 120 to generate an asserted SCAN RESET signal that can be applied directly to the reset pins of latches 182, 184 and state machine 150. Alternatively suitable hardware, software or firmware controller could modify the data in latches 182, 184 and state machine 150, randomly or otherwise, to ensure that no secure data can be retrieved from the latches.

In step 230, the scan controller checks that any sensitive data has been cleared or otherwise modified. Step 230 may check for the presence of an asserted EVENT TRIGGER signal at an input to scan controller 120, and if the EVENT TRIGGER signal is not asserted, then the SCAN ENABLE (INTERNAL) signal is not asserted. For example, if it is desired to reset secure ram 140 before allowing access to scan chain 180, then scan controller 120 could wait for a signal from ram reset 170 indicating that a reset of secure ram 140 had been completed. In other embodiments, no EVENT TRIGGER signal is needed because the timing for modification of data in scan-chain elements is deterministic, and step 230 is accomplished simply by waiting a number of clock cycles sufficient to allow latches 182–184 to be reset.

Once the sensitive data has been modified in step 230, scan controller 120 allows access to scan chain 180 in step 240. During step 240, normal scan testing procedures known to those skilled in the art can be employed without sacrificing the security of sensitive information that may have been previously stored in any of the scan-observable elements of scan chain 180. Data can be scanned into SCAN-IN port 181 and read out from SCAN-OUT port 189 for testing the functionality of various internal portions of processor 100.

When scan testing is complete, the method of FIG. 2 proceeds from step 240 to step 250. In step 250, preparations are made to exit scan testing mode and reenter normal mode.

In one embodiment, during step 250, access to scan chain 180 is blocked and any data in latches 182, 184 and state machine 150 is modified or reset. Scan chain 180 may be blocked by notifying scan controller 120 (FIG. 1) to enter a normal mode by de-asserting the TEST MODE signal. In response to de-asserting the TEST MODE signal, a SCAN RESET SIGNAL may be asserted to reset latches 182, 184 and state machine 150 (FIG. 1), and any other elements of scan chain 180 that may include read or write sensitive information. In addition, elements on the observable portion of the scan chain may be reconfigured to prevent data from being scanned out. The signals used to prepare the scan chain for normal operation are described in greater detail with reference to FIG. 7.

Clearing information from scan-observable portions of processor 100 before exiting to a non-test state prevents someone from scanning in "seed" information during a scan test, and then monitoring the outputs of processor 100 to determine what operations have been performed on the seed information. Clearing the information at this point also prevents someone from setting a state machine, for example state machine 150, to a particular state which could, for example, "trick" the processor into believing it is operating in a secure mode, when in fact it is not. In at least one embodiment, a SCAN EXIT signal generated during step 250 may be used as an input to various state machines to indicate that the current state may not be accurate, in place of or in addition to modifying/resetting the data as discussed in the previous paragraph. The state machines can then transition to a known state on its own, even if the state bits are not cleared on scan exit.

In step 260 scan controller 120 checks to make sure that data is cleared from any necessary scan-observable portions of processor 100 by using the same or similar techniques as those discussed in regard to step 230. For example, in one embodiment scan controller 120 may wait for assertion of an EVENT TRIGGER signal to indicate that a reset has completed before asserting a SCAN DATA ENABLE signal, which may be used to allow or prevent data from being shifted into or out of scan chain 180. In another embodiment, which will be discussed in greater detail subsequently with respect to FIG. 5, de-assertion of an UNSECURE* signal may be predicated upon assertion of an EVENT TRIGGER signal.

Figure 3:
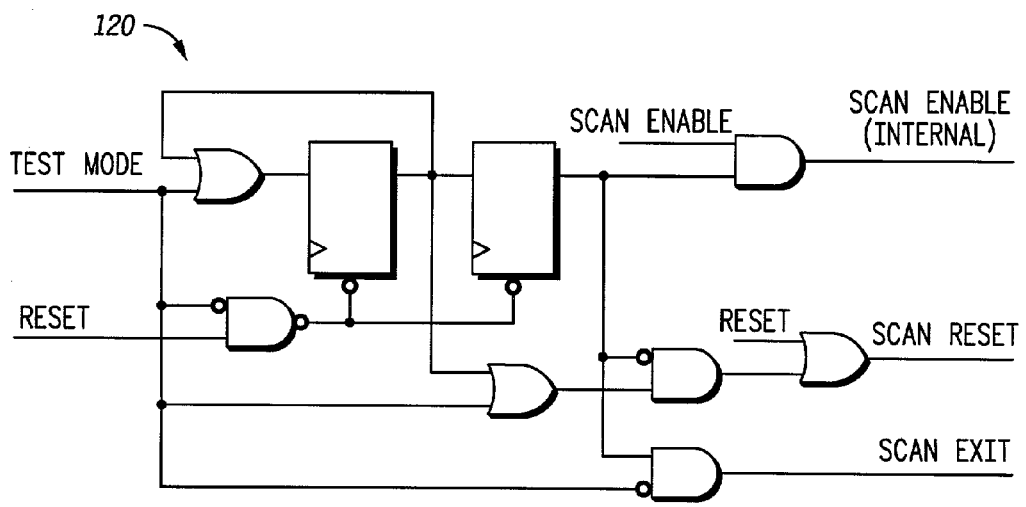
FIGS. 3–5 are logic diagrams illustrating scan controllers for controlling access to a scan chain according to various embodiments of the present disclosure.
Figure 4:
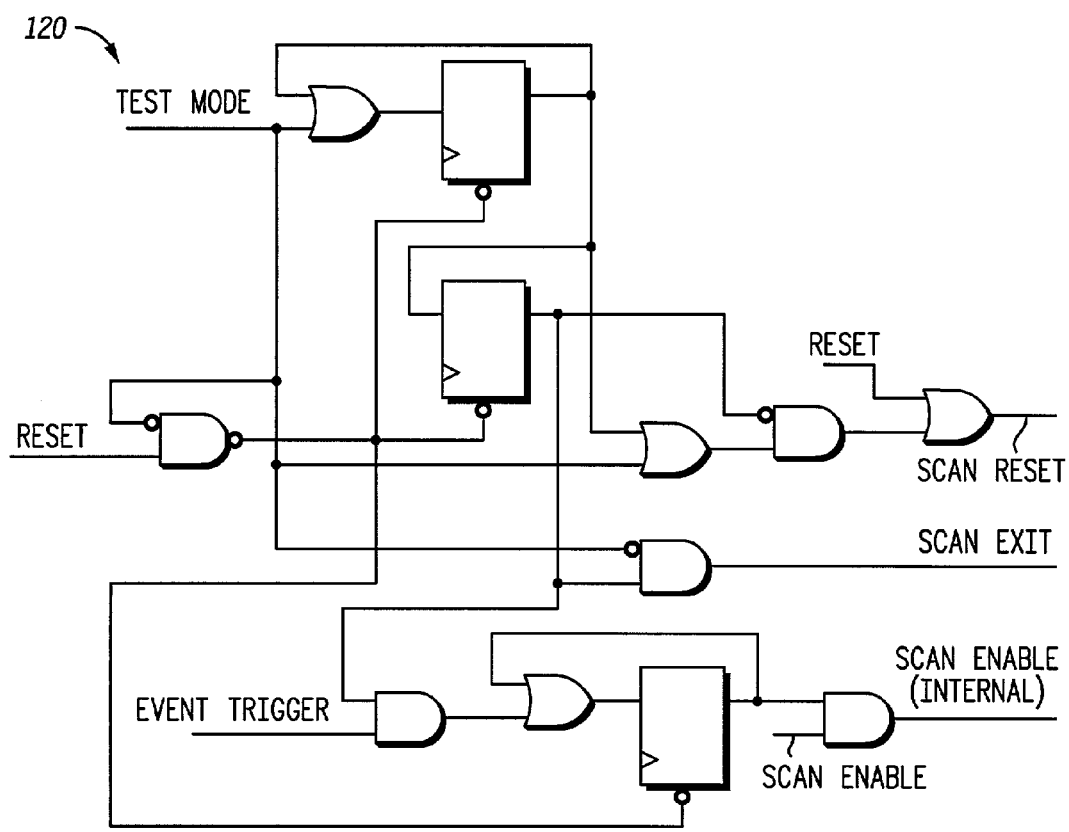

The UNSECURE* signal, which will be discussed with reference to FIG. 5, may be used to control one or more elements on scan chain 180 to prevent or allow configuration of various elements on scan chain 180 for normal operations. For example, UNSECURE* may be used in place of a control signal, such as the SCAN DATA ENABLE signal illustrated in FIG. 1 to prevent data from being output. Alternatively, UNSECURE* may be used as one input to a logic circuit used to generate one or more signals, for example SCAN DATA ENABLE or SCAN ENABLE (INTERNAL). In at least one embodiment, the UNSECURE* signal (FIG. 5) combines the functionality of both SCAN RESET and SCAN EXIT signals (FIGS. 3–4). Once the data and/or state information is cleared, then scan controller 120 or another suitable hardware, software or firmware element can return processor 100 to normal mode.

It will be appreciated that the various steps of the method of FIG. 2 may be implemented concurrently or in a different order without departing from the teachings set forth herein. For example, checking to see that sensitive data is cleared from scan-observable elements as in step 230 may be performed during normal mode 210 in addition to being performed after step 230. Alternatively, checking whether or not sensitive data has been cleared may be performed continuously. Also, depending on various design, marketing, cost, security or other factors, certain portions of the method described in FIG. 2 may be implemented exclusive of other portions. For example, only data in certain latches may be cleared upon entry into a test mode, as in step 220, and steps 250 and 260 may be used only to clear state information from secure state machines before exiting to normal mode.

Referring next to FIG. 3, a particular embodiment of a portion of scan controller 120 will be discussed. In the illustrated embodiment, the portion of scan controller 120 has three inputs: TEST MODE, RESET and SCAN ENABLE. These three inputs are used in combination to generate three outputs: SCAN ENABLE (INTERNAL), SCAN RESET and SCAN EXIT. TEST MODE is a signal used to functionally modify circuits to make them more easily tested. It is asserted before scan testing begins. SCAN ENABLE is a signal that is used to shift data into the scan chain, and RESET is a signal indicating that internal data is to be cleared, set to a known state and/or otherwise modified. SCAN ENABLE (INTERNAL) is a gated version of SCAN ENABLE that is used by internal circuits in place of SCAN ENABLE to shift data through the scan chain. SCAN RESET when asserted can be used to clear sensitive data from scan-observable elements of the scan chain. SCAN EXIT when asserted is a signal that indicates that test mode, as indicated by the TEST MODE signal, has been deasserted, and can be used as an input to a state machine to force a state transition to a known state.

Portion of scan controller 120 ensures that no data can be shifted into the scan chain until after information in sensitive circuitry has been cleared. For example, data cannot be shifted into the scan chain until the TEST MODE signal is asserted, indicating that the circuitry being controlled is in a test mode. Furthermore, portion of scan controller 120 delays shifting information into the scan chain until two clock cycles after the TEST MODE signal has been asserted. This ensures that scan controller 120 has had time to generate the SCAN RESET pulse, which is generated automatically upon assertion of the TEST MODE signal. When the test mode is exited, as indicated by de-assertion of the TEST MODE signal, the SCAN EXIT signal is asserted. The timing of signals will be discussed in greater detail subsequently, with reference to FIGS. 6 and 7.

Referring next to FIG. 4, another embodiment of a portion of scan controller 120 is shown. The logic shown in the illustrated embodiment, is essentially the same as that described with reference to FIG. 3, except that assertion of the SCAN ENABLE (INTERNAL) is now predicated on assertion of an EVENT TRIGGER signal. It will be appreciated that the scan controller shown in FIG. 3 can be modified to include the functionality provided by the scan controller shown in FIG. 4, as desired. The EVENT TRIGGER signal, as discussed in reference to FIG. 1, is used as an additional control to ensure that information in the circuitry being controlled has been modified, reset, cleared, etc., and that all or particular elements of the scan chain are cleared, set or otherwise ready to enter test mode. Only upon receipt of the EVENT TRIGGER signal will the output signal, SCAN ENABLE (INTERNAL), be generated. The SCAN ENABLE (INTERNAL) signal can be used as discussed in FIG. 3, including to control an input or output gate, flip-flop, etc. to prevent shifting data into or out of the scan chain.

Figure 5:
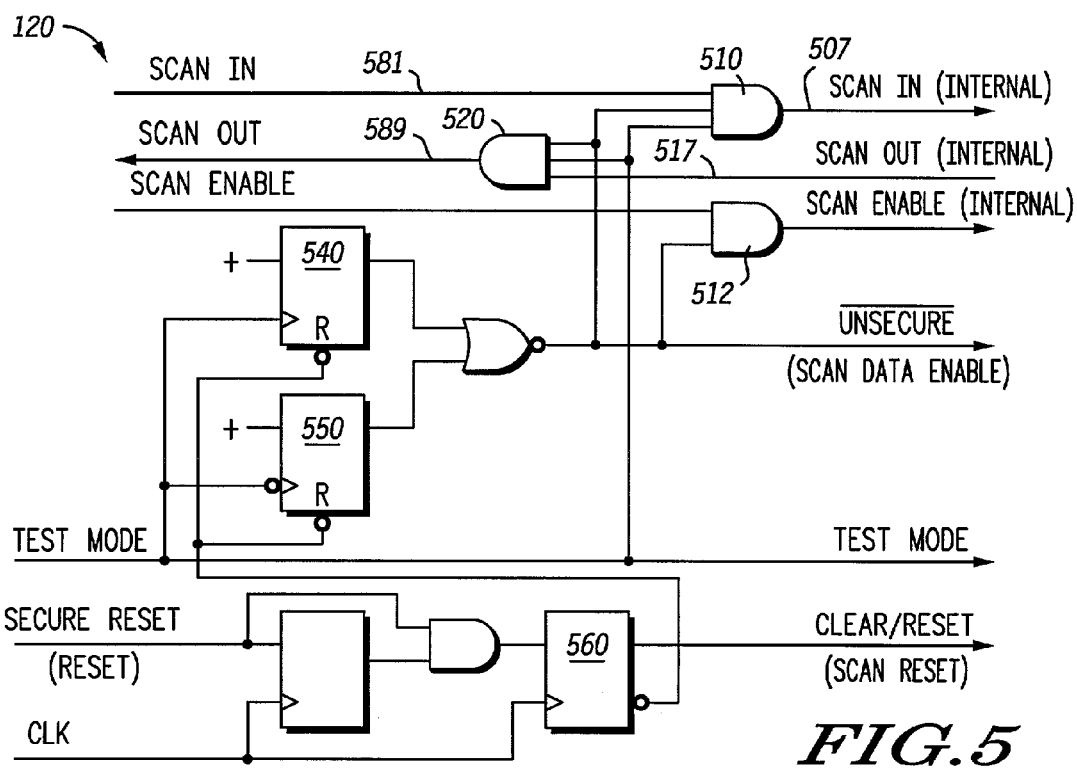

Referring next to FIG. 5, an embodiment comprising a portion of scan controller 120 employing asynchronous flip-flops will be considered. The embodiment illustrated in FIG. 5 operates to achieve essentially the same effect as the embodiments illustrated in FIGS. 3 and 4, but using a slightly different logic configuration. In addition, FIG. 5 illustrates logic including gates 510 and 520 having outputs connected to nodes 507 and 589, respectively, that can be part of a modified scan controller or other circuitry in FIG. 1.

Referring to the illustration of FIG. 5, the TEST MODE signal is fed into the clock input of flip-flop 540, and into the inverted clock input of flip-flop 550, such that the rising edge of the TEST MODE signal causes the output of flip-flop 540 to go high, and the falling edge of the TEST MODE signal causes the output of flip-flop 550 to go high.

Therefore, any transition of TEST MODE, assuming the RESET inputs to the flops are de-asserted, causes UNSECURE* to be asserted. When UNSECURE* is asserted SCAN ENABLE INTERNAL is de-asserted, preventing operation of the scan chain. The reset inputs of flip-flops 540 and 550, which are asynchronous, are connected to the inverting output of flip-flop 560, so that flip-flops 540 and 550 are reset in response to a SECURE RESET signal. SECURE RESET may be generated as part of a system reset, in response to a user action, or otherwise. In at least one embodiment, SECURE RESET is a particular instance of the RESET signal illustrated in FIG. 1. Because the signal inputs of flip-flops 540 and 550 are tied to a high reference voltage, when the SECURE RESET signal is asserted for at least two clock cycles, the active low logic signal UNSECURE* is de-asserted (i.e. a logic high value), indicating that the sensitive data is secure.

In the illustrated embodiment, when TEST MODE is asserted prior to the SECURE RESET signal being asserted, the UNSECURE* signal is de-asserted following receipt of the asserted SECURE RESET signal, indicating that the sensitive data is secure, and UNSECURE* remains unasserted even after the SECURE RESET signal has been de-asserted. However, if the TEST MODE signal changes state after the SECURE RESET signal has been de-asserted, the UNSECURE* signal asserted, indicating that data in the scan chain is not secure. To aid in understanding the function of the UNSECURE* signal, consider the example in the following paragraph.

In considering the following example, note that SCAN IN (INTERNAL) 507, SCAN OUT (INTERNAL) 517 and SCAN ENABLE (INTERNAL) are gated versions of SCAN IN 181, SCAN OUT 189 and SCAN ENABLE (FIG. 1), all of which can be used to restrict outside access of scan chain 180. Note that SCAN IN (INTERNAL) and SCAN OUT (INTERNAL) are not expressly illustrated in FIG. 1, however, if implemented would gate the SCAN IN and SCAN OUT signals illustrated in FIG. 1. For example, assume that scan chain 180 (FIG. 1) is currently in a scan-test mode, with the TEST MODE signal asserted, and the UNSECURE* signal unasserted. To exit scan test mode, the TEST MODE signal is de-asserted. Flip-flop 550 is triggered by the falling edge of the TEST MODE signal, which causes UNSECURE* to be asserted. The asserted UNSECURE* signal indicates that the scan-test mode is being exited, and that data in the scan chain 180 (FIG. 1) may need to be cleared out. In the illustrated embodiment, UNSECURE* is used as an input to logic gate 510 to block data SCAN IN 581 from passing through AND gate 510 and becoming SCAN IN (INTERNAL) data 507, which can be scanned into scan chain 180 (FIG. 1), and data SCAN OUT (INTERNAL) 517 from being read out of scan chain 180 (FIG. 1). In addition, UNSECURE* is used as an input to logic gate 512 to block SCAN ENABLE (INTERNAL) from-being asserted in response to SCAN ENABLE if the data is not secure. It will be appreciated that any of these methods can be used to prevent data from being scanned out of device 100.

In addition to being used as an input to logic gates 510, 512, and 520, the UNSECURE* signal may be used, for example to notify a central processor, to assert a SECURE RESET signal, or to otherwise clear the data in the scan chain. It can also be used to set a secure/un-secure register (not illustrated) to which various firmware or software can refer to determine the status of the scan chain. Alternatively, the UNSECURE* signal could be used as a direct input to control the configuration of one or more of the latches or state machines illustrated in FIG. 1.

Finally, the embodiment shown in FIG. 5 uses a SECURE RESET signal to generate an asserted CLEAR/RESET signal to modify data stored in scan-observable elements of the scan chain. Note CLEAR/RESET can be analogous to SCAN RESET of FIG. 1. The SECURE RESET signal may be automatically generated by other circuitry within a processor employing scan controller 120, or a system may be configured to generate a SECURE RESET signal only after an operator physically initiates a reset.

Figure 6:
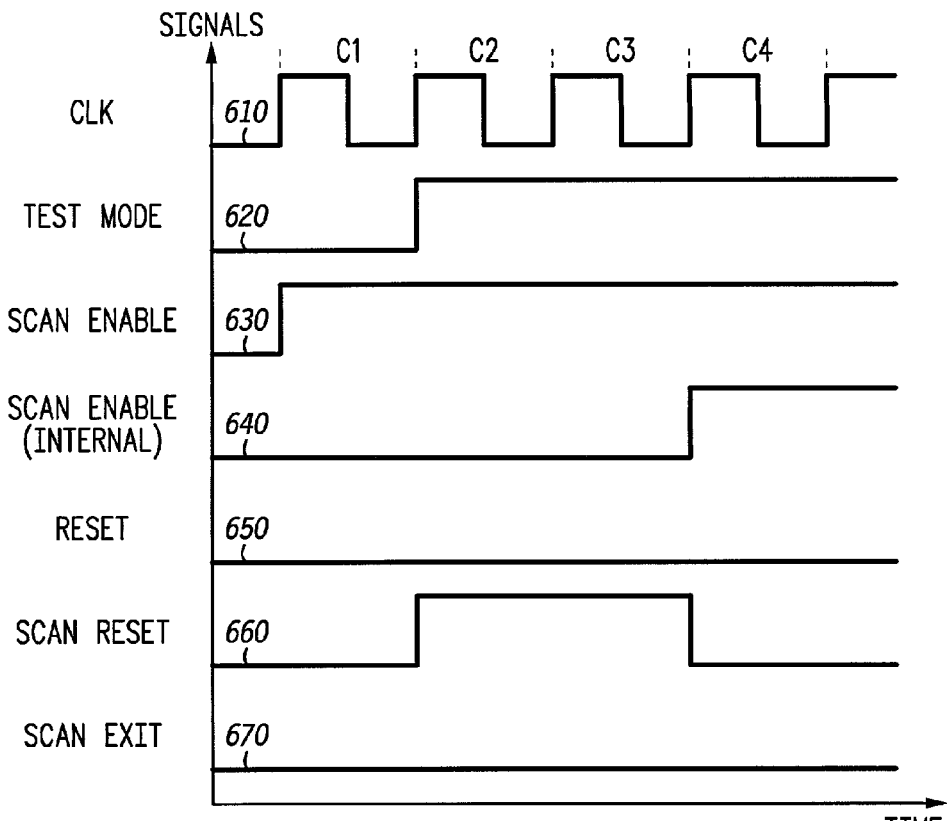
FIG. 6 is an exemplary timing diagram illustrating the timing of the logic diagram shown in FIG. 3 associated with entry into a test mode.

Referring next to FIGS. 3 and 6, the timing relationship between the signals used in one embodiment of a scan controller will be discussed. FIG. 6 illustrates the timing relationship upon entry into a test mode. All timing in the following discussion is with reference to clock 610, and in particular the first rising edge of clock cycle C1. Prior to the beginning of clock cycle C1, all of the signals are unasserted, indicating operation in a normal, that is non-test, mode. During the first half of clock cycle C1, a user attempts to enable scanning by asserting SCAN ENABLE 630. Since the processor employing scan controller 120 is still operating in normal mode, asserting SCAN ENABLE 630 does not cause SCAN ENABLE (INTERNAL) 640 to go high.

However, at the first rising edge of second clock cycle C2, TEST MODE 620 is asserted. SCAN RESET 660 goes high in response to the assertion of TEST MODE 620. SCAN RESET 660 is a pulse that triggers the modification, reset or clearing of scan-observable elements on the scan chain (see FIG. 1). At the first rising edge of clock cycle C4, two rising clock edges after TEST MODE 620 is asserted, SCAN ENABLE (INTERNAL) 640 goes high, in response to both SCAN ENABLE 630 and TEST MODE 620 being high. Delaying the assertion of SCAN ENABLE (INTERNAL) 640, for two clock cycles allows a reset to be performed before access to the scan chain is allowed, thereby protecting sensitive information upon entry into a test mode. Note that RESET 650 and SCAN EXIT 670 are not asserted during entry into test mode. Some time after SCAN ENABLE (INTERNAL) is asserted at cycle C4, in response to TEST MODE 620 being asserted at cycle C1, data can be shifted into and out of the scan chain, in order to facilitate testing of internal processor components, but at this point any secure information has been cleared.

Figure 7:
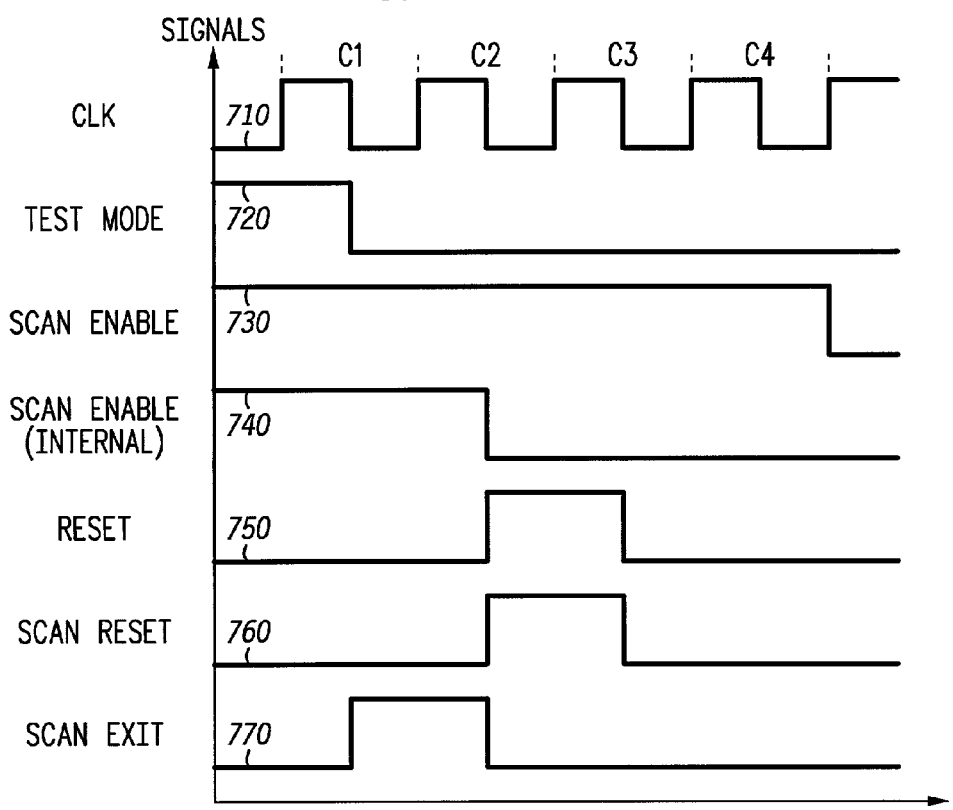
FIG. 7 is an exemplary timing diagram illustrating the timing of the logic diagram shown in FIG. 3 associated with exit from a test mode.

Referring next to FIGS. 3 and 7, the timing relationship between the signals used in one embodiment of a scan controller will be further discussed, particularly the timing relationship upon exit from test mode. Timing relationships of the signals shown in FIG. 7 will be discussed with reference to the first rising edge of clock cycle C1. At the beginning of clock cycle C1, TEST MODE 720, SCAN ENABLE 730, and SCAN ENABLE (INTERNAL) 740 are asserted, while all other signals are negated. This corresponds to a test-mode, in which data can be freely shifted into and out of the scan chain with no fear of compromising sensitive data. At the falling edge of the clock cycle C1, TEST MODE 720 is negated, signaling the end of the test cycle and entry into a normal mode. At the same time that TEST MODE 720 is negated, SCAN EXIT 770 is asserted to signal that since the last time RESET 750 was asserted, test mode has been entered and exited. SCAN EXIT 770 can be used as an input to a state machine to force a state transition to a known state, can be used as an input to a latch to control the latch's operational state, can be coupled to a processor to indicate that data in the scan chain needs to be reset before allowing it to be used in normal operations, or can be used in various other similar ways to indicate that a scan-test mode has been exited.

At the falling edge of the second clock cycle C2, RESET 750 is asserted, which causes SCAN RESET 760 to be asserted. SCAN RESET 760 is, in at least one embodiment, used as a reset input to data latches and state machines that form the scan chain. When used in this way, SCAN RESET 760 clears sensitive data from the scan chain upon exiting a scan-test mode. SCAN ENABLE (INTERNAL) 740 goes low at the same time SCAN EXIT 770 is negated, thereby preventing data from being scanned out of the scan chain after scan-test mode has been exited. Finally, SCAN ENABLE 730 is de-asserted, so that no additional data may be scanned into the scan chain. Note that in the embodiment of scan controller 120 for which timing is considered here, SCAN RESET 760 is not automatically asserted when TEST MODE 720 is negated. Instead, RESET 750 should be asserted, in response to user action or otherwise, thereby causing SCAN RESET 760 to be asserted, to clear the scan chain before entering a normal mode. Other embodiments may generate a reset pulse similar to RESET 750 automatically upon exiting a test mode.

In summary, it should be apparent from review of the foregoing disclosure that by modifying information stored in a scan-observable portion of a processor before and after allowing access to the scan chain, a processor employing a scan controller constructed according to the teachings set forth herein can provide increased data security without sacrificing testability. Increased data security can help to deter would-be copyists from exploiting sensitive data by limiting their access to the data. At the same time, greater testability can serve to reduce manufacturing costs and speed a product's introduction to the market.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical, and electrical changes may be made without departing from the spirit or scope of the invention.

To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method comprising:
receiving an asserted reset signal to place a scan chain of a data processor in a reset state;
receiving an asserted scan test signal, subsequent to the asserted reset signal being negated, to enable entering a scan test mode to read information that is present in the scan chain prior to receiving the asserted scan test signal, wherein data in the scan chain can be shifted during the scan test mode;
modifying data in the scan chain in response to receiving the asserted scan test signal and prior to shifting data in the scan chain; and
enabling shifting of data in the scan chain during scan test mode in response to receiving the asserted scan test signal and after modifying the data in the scan chain.

2. The method as in claim 1, wherein:
modifying the data comprises modifying a portion of the data stored in the scan chain in response to receiving the asserted scan test signal.

3. The method as in claim 2, wherein the portion of the data stored in the scan chain is associated with a secure portion of the data processor.

4. The method as in claim 1, wherein, prior to enabling, data in the scan chain is prevented from being shifted between a plurality of scan latches comprising the scan chain.

5. The method as in claim 1, wherein, prior to enabling, data in the scan chain is prevented from being shifted out of the data processor.

6. The method as in claim 1, wherein enabling further comprises enabling shifting of data in the scan chain a predetermined number of clock cycles after receiving the asserted scan test signal.

7. The method as in claim 1 further comprising:
initiating an event in response to receiving the asserted scan test signal; and
wherein enabling shifting is performed in response to receiving an event trigger signal generated in response to execution of the event.

8. The method as in claim 7, wherein initiating the event comprises the event being a modify memory operation.

9. The method as in claim 8, wherein the event trigger signal is generated upon completion of the modify memory operation.

10. The method as in claim 7, wherein the event trigger signal is generated upon completion of the event.

11. The method of claim 1 wherein modifying the data occurs after receiving the data in response to a clock cycle, and enabling includes enabling the shifting of data after the clock cycle.

12. The method as in claim 1 further comprising:
receiving a negated scan test signal to enable operating the data processor in a normal mode of operation after receiving the reset signal and before receiving the asserted scan test signal.

13. The method as in claim 1 further comprising:
receiving a negated scan test signal to enable operating the data processor in a normal mode of operation after enabling shifting of the data; and
modifying data in the scan chain in response to receiving the negated scan test signal.

14. The method as in claim 13, wherein modifying data in the scan chain in response to receiving the negated scan test signal comprises modifying data in a same portion of the scan chain as is modified when modifying data in the scan chain in response to receiving the asserted scan test signal.

15. The method as in claim 13, wherein modifying data in the scan chain in response to receiving the negated scan test signal comprises modifying data in a different portion of the scan chain as is modified when modifying data in the scan chain in response to receiving the asserted scan test signal.

16. The method as in claim 13, further comprising:
entering normal mode of operation at the data processor, subsequent to modifying data in the scan chain, in response to receiving the negated scan test signal.

17. A system comprising:
a means for receiving an asserted reset signal at a data processor to place a scan chain of the data processor in a reset state;
a means for receiving an asserted scan test signal, at the data processor subsequent to the reset signal being negated, to enable entering a scan test mode to read information that is stored in the scan chain prior to receiving the asserted scan test signal, wherein data in the scan chain can be shifted during the scan test mode;
a means for modifying data in the scan chain in response to receiving the asserted scan test signal and prior to shifting data in the scan chain; and
a means for enabling shifting of data in the scan chain during scan test mode in response to receiving the asserted scan test signal after modifying the data in the scan chain.

18. The system as in claim 17, wherein the means for modifying data in the scan chain comprises means for modifying a portion of the data stored in the scan chain in response to receiving the asserted scan test signal.

19. The system as in claim 18, wherein the portion of the data stored in the scan chain is associated with a secure portion of the data processor.

* * * * *